3,465,407
APPARATUS FOR ASSEMBLING A SLEEVE BEARING
Mathias Rau, 16340 S. Temple Drive, Minnetonka, Minn. 55343
Filed Oct. 25, 1966, Ser. No. 589,385
Int. Cl. B23p 19/04; B23q 7/00
U.S. Cl. 29—200                4 Claims

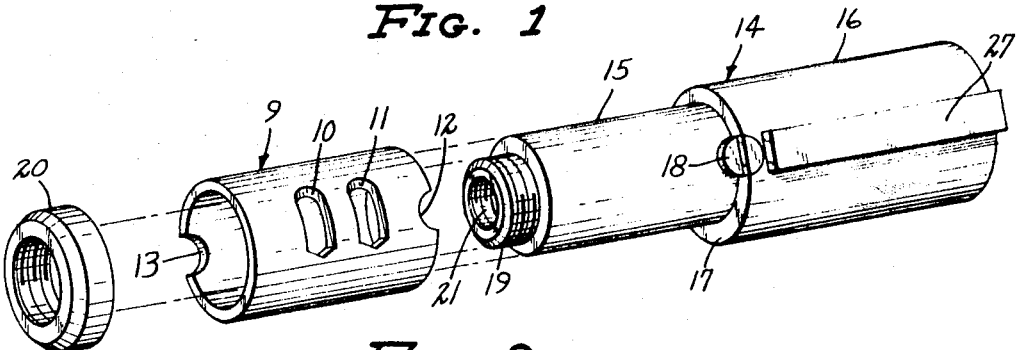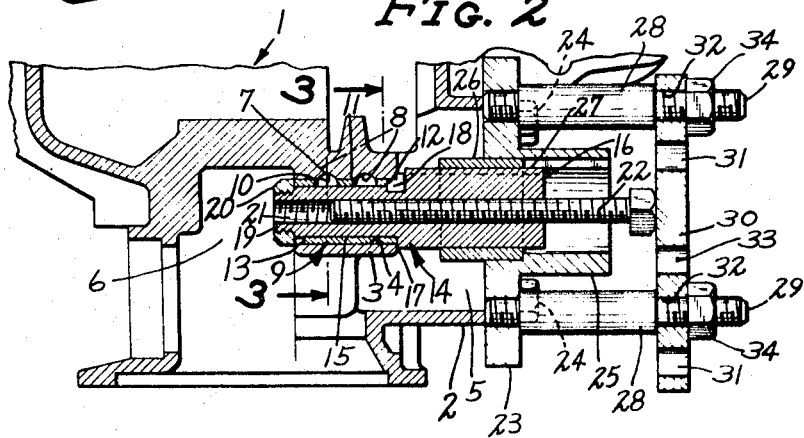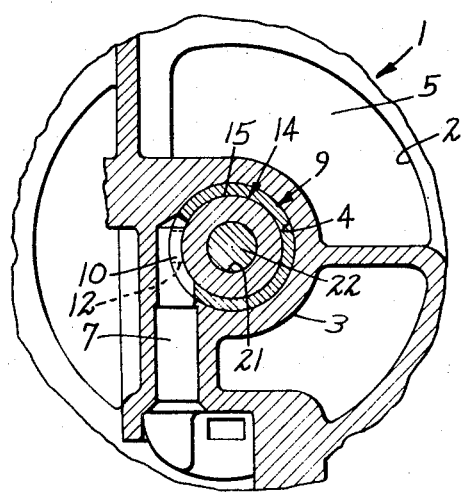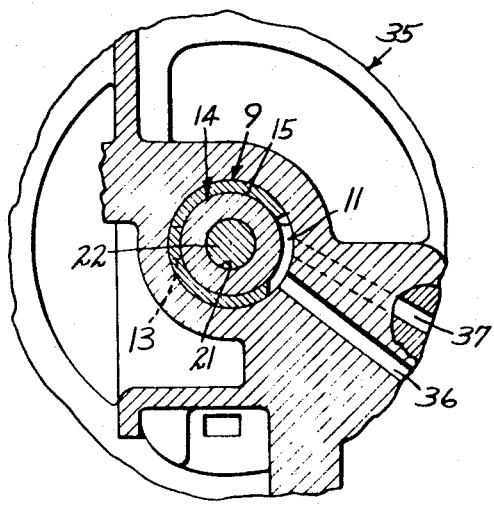
INVENTOR.
MATHIAS RAU
BY
Merchant & Gould
ATTORNEYS

United States Patent Office 3,465,407
Patented Sept. 9, 1969

ABSTRACT OF THE DISCLOSURE

A mandrel comprises a body portion and a reduced diameter portion cooperating with the body portion to provide an annular shoulder for reception of a sleeve bearing, having openings extending radially therethrough, on the reduced diameter portion in abutting relationship with the annular shoulder. The annular shoulder has an axially projecting indexing portion for registration with a cooperating axially projecting indexing portion on the sleeve bearing to dispose the openings in the bearing in a predetermined position circumferentially of the mandrel. A frame mounts the mandrel on a workpiece in axial alignment with a bearing receiving aperture in the workpiece.

BACKGROUND OF THE INVENTION

Heretofore, in the mounting or inserting of ported sleeve bearings in a bearing receiving aperture, it has been difficult to properly position the bearing and maintain its position, so that, when the bearing is inserted, the ports therein will accurately register with cooperating passages terminating in the bearing receiving aperture. In some instances where the workpiece passages are accessible from the exterior of the workpiece, an unported sleeve bearing may be inserted and a drill bit passed through the passage to drill the port or ports in the sleeve bearing. However, in most instances, such access to the passages is not available.

SUMMARY OF THE INVENTION

An important object of this invention is the provision of apparatus for assembling a sleeve bearing with a workpiece in a predetermined relationship therebetween circumferentially of the bearing. To this end, I provide a mandrel having a body portion, a diametrically reduced sleeve bearing receiving portion, and an annular shoulder for abutting engagement with a sleeve bearing on said reduced diameter portion. An axially projecting indexing portion at said annular shoulder cooperates with an axially projecting indexing portion of the sleeve bearing to dispose the bearing in a predetermined relationship circumferentially of the mandrel and with a bearing receiving aperture in the workpiece to accurately align openings in the sleeve bearing with respective passages in the workpiece.

DESCRIPTION OF THE DRAWINGS

FIG. 1 is an exploded view in perspective of a sleeve bearing produced in accordance with this invention, and a mounting mandrel therefor;

FIG. 2 is a fragmentary view in axial section of a workpiece, and means for inserting the bearing therein;

FIG. 3 is an enlarged fragmentary transverse section taken substantially on the line 3—3 of FIG. 2; and FIG. 4 is a view corresponding to FIG. 3, showing the bearing of this invention mounted in a workpiece of different design and fluid passage arrangement.

In FIGS. 1 and 2, a workpiece 1 is shown as including a generally cylindrical portion 2 and a bearing boss 3 which defines a bearing-receiving aperture 4 axially aligned with the cylindrical portion 2. For the purpose of the present example, the workpiece 1 is a portion of the housing of an automatic or self-shifting automotive transmission mechanism, commonly known in the trade as a "hydramatic" transmission. The cylindrical portion 2 defines the side wall of a generally cylindrical chamber 5 which normally contains a rotary governor, not shown, the governor having an axial shaft that extends axially through the bearing receiving opening 4. Normally, the shaft of the governor extends into a chamber portion 6 of the housing 1, and therein is provided with a gear by means of which the governor is rotated from driving mechanism, not shown, but normally contained in the housing 1. As is well known to those familiar with automatic transmissions, the governor includes valve means for hydraulically controlling the shifting of gear ratios within the transmission mechanism, fluid under relatively high pressures being delivered to and away from the governor through passages 7 and 8 in the housing 1, opening into the aperture 4 and communicating with operating passages in the governor shaft.

The form of sleeve bearing shown in the drawings is particularly adapted to be inserted or mounted in the aperture 4 to journal the governor shaft, and is indicated at 9. The sleeve bearing 9 is in the nature of a tubular element preferably made from bronze or other suitable bearing material, and is formed to provide a pair of axially spaced circumferentially extending slot-like openings 10 and 11 extending radially therethrough for registration with the adjacent terminal portions of the fluid passages 7 and 8 respectively. Usually, the transmission housing 1 is made from relatively soft, lightweight material such as aluminum, and the sleeve bearing 9 is press fitted in the aperture 4, so that the bearing 9 will remain stationary while the governor shaft rotates therein. It will be appreciated that the openings 10 and 11 establish communication between their respective passages 7 and 8 and cooperating passages in the governor shaft, not shown. With reference particularly to FIG. 1, it will be seen that the sleeve bearing 9 is formed to provide a pair of axially outwardly opening notches 12 and 13 at diametrically opposite portions of the bearing, each of the notches 12 and 13 being formed in an opposite end of the bearing 9. It will be appreciated that, if desired, both of the notches 12 and 13 may be disposed at one end of the bearing 9.

It will be appreciated that, in view of the relatively high pressures of fluid in the passages 7 and 8, the fit between the sleeve bearing 9 and the governor shaft journalled therein must be sufficiently close to prevent leakage of fluid therebetween. It has been found that foreign matter, such as metal particles which have broken loose from parts of the transmission mechanism, are often carried by the hydraulic fluid through the passages 7 and 8 and their respective ports 10 and 11, and become lodged between the bearing 9 and the governor shaft, causing the shaft to seize. Then, when the governor is removed, the metal particles score the inner wall surface of the bearing, creating a source of leakage. Thus, replacement of the bearing 9 is a frequent service required in this type of automatic transmission.

For the purpose of removing the sleeve bearing 9 and for replacement thereof, I provide apparatus including a mandrel 14 and other parts now to be described. The mandrel 14 includes a diametrically reduced cylindrical bearing mounting portion 15 and a diametrically enlarged body portion 16, the portions 15 and 16 cooperating to define an annular shoulder 17 against which one end of the sleeve bearing 9 abuts. An indexing lug 18 projects radially outwardly from the cylindrical portion 15 adjacent the shoulder 17, and is adapted to be selectively received in one of the notches 12 and 13 of the sleeve bearing 9. The bearing receiving portion 15 has a diametrically reduced threaded outer end 19 that is adapted to screw threadedly receive a retaining nut 20 for positively holding the sleeve bearing 9 on the mandrel 14 against axial movement. Further, the mandrel 14 is provided with a threaded axial opening 21 for reception of an elongated bolt 22.

Means for mounting the mandrel 14 for movements axially toward and away from the bearing receiving aperture 4 comrpises a mounting frame 23 that is adapted to be bolted to the outer end of the cylindrical wall 2 by machine screws or the like 24 that are screw threaded into the threaded openings, not shown, in the housing 1 which threaded openings normally receive the screws which anchor a governor cover, not shown, in place. The mounting frame 23 includes a central hollow boss 25 in which is rigidly mounted a bushing 26 having an internal keyway for reception of a cooperating key 27 on the body portion 16 of the mandrel 14. The frame 23 further includes a pair of diametrically opposed parallel legs 28 having diametrically reduced and screw threaded outer end portions 29 on which is mounted a rigid bar 30. As shown in FIG. 2, the bar 30 is provided with a pair of spaced openings 31, a second pair of spaced openings 32, and a single opening 33 at its generally central portion. The bar 30 is adapted to be mounted on the leg ends 29 in two selected positions. In the position shown in FIG. 2, the leg ends 29 extend through the openings 32, the bar 30 being anchored in place by nuts 34 screw threaded on the leg ends 29.

When it is desired to remove a damaged sleeve bearing 9 from the work piece 1, the frame 23, with the bar 30 removed therefrom and the retaining nut 20 and bolt 22 removed from the mandrel 14, is placed against the work piece 1 and the mandrel 14 inserted into the sleeve bearing 9. The frame 23 is then secured to the work piece by means of the screws 24 and the retaining nut 20 applied to the end portion 19 of the mandrel 14. Next, the bar 30 is mounted on the legs 28 with the leg ends 29 thereof extending through the openings 31 of the bar 30, and the nuts 34 applied to the end portion 29. This position of the bar 30 on the legs 28 brings the generally central opening into axial alignment with the threaded opening 21 of the mandrel 14. The bolt 22 is then inserted through the opening 33 and threaded into the axial opening 21 of the mandrel 14 to bring the head of the bolt 22 into engagement with the outer surface of the bar 30. Continued threading of the bolt 22 into the mandrel 14 will cause the mandrel to be moved axially outwardly toward the bar 30, carrying with it the sleeve bearing 9, until the bearing is completely removed from the work piece. The mandrel 14 is then removed from the base 23 by removing the bar 30 from the legs 28 and pulling the mandrel 14 axially outwardly from the tubular boss 25. The bolt 22 is then removed from the mandrel 14 and bar 30, and the worn or damaged bearing 9 removed from the mandrel, after which a replacement bearing 9 is placed on the bearing receiving portion 15 of the mandrel with the lug 18 being received in the notch 12 of the bearing 9. The retainging nut 20 is remounted on the mandrel portion 19 and the mandrel re-inserted into the bushing 26 of the frame 23. After re-inserting the bolt 22 into the opening 21, as shown in FIG. 2, the bar 30 is replaced on the legs 28 with the end portions 29 being received in the openings 32, and the bar 30 anchored in place. The bolt 22 is then rotated in a direction to bring the head thereof into engagement with the adjacent inner surface of the bar 30, continued rotation of the bolt 22 causing the mandrel 14 with the new bearing 9 thereon to advance toward the bearing receiving aperture 4 in the work piece 1, until the shoulder 14 engages the adjacent end of the bearing boss 3. The retaining nut 20 is then removed, after which the mandrel 14 may be withdrawn and the frame 23 removed from the workpiece 1, leaving the new bearing 9 properly seated in the aperture 4 with the ports 10 and 11 in proper registration with their respective passages 7 and 8. It should be borne in mind that, when the frame 23 is first applied to the work piece 1, the frame 23 must be rotated on the work piece 1 to bring the indexing lug 18 into register with the notch 12 of the bearing which is to be removed.

The workpiece shown in FIG. 4, and indicated by the reference character 35, differs from the work piece 1 in the locality of the fluid passages leading to the bearing receiving bore. In FIG. 4, fluid passages are indicated at 36 and 37, substantially diametrically opposite the passages 7 and 8 in the work piece 1. In removing and replacing a bearing 9 in the work piece 35, the sleeve bearing 9 is reversed end-for-end so that the indexing lug 18 is received in the notch 13. Thus, the ports 10 and 11 are diametrically opposite their position shown in FIGS 1 and 2 and are disposed in register with their respective ports 36 and 37. Should circumstances arise wherein the ports 10 and 11 are closer to one end of the bearing 9 than the other end thereof, and passages of different work pieces are disposed at a given similar distance from one end of the bearing boss, both notches 12 and 13 would advantageously be disposed in the same end of the bearing 9.

What is claimed is:

1. Apparatus for assembling a one-piece sleeve bearing having an axial shaft-receiving opening and axially spaced openings extending radially therethrough to provide spaced passages for fluid between the shaft-receiving opening and the exterior of the bearing, said apparatus comprising a mandrel having a body portion and a diametrically reduced bearing mounting portion for telescopically receiving the sleeve bearing, said bearing mounting portion cooperating with the body portion to provide an annular shoulder for abutting engagement with one end of the sleeve bearing, said mandrel having an indexing portion at said annular shoulder for registry with a cooperating indexing portion at an adjacent end of said sleeve bearing, when said bearing is received on said bearing mounting portion, to disposed said sleeve bearing in a predetermined position of said axially spaced openings circumferentially relative to said mandrel.

2. The structure of claim 1 wherein said indexing portions of said apparatus comprise an axially projecting lug on one of said mandrel shoulder and sleeve bearing and lug receiving notch on the other of said mandrel shoulder and sleeve bearing.

3. The structure of claim 2 wherein a pair of lug receiving notches are formed one in each end of said sleeve bearing, said lug projecting axially from said mandrel shoulder.

4. The structure of claim 1 in which said apparatus further comprises a frame having a tubular guide portion and adapted to be mounted in a predetermined position on a workpiece having a bearing receiving aperture and fluid passages to said bearing receiving aperture, to axially align said tubular guide portion with said bearing receiving opening, said mandrel being axially movably mounted in said tubular guide portion, and means including a key for holding said mandrel against rotation relative to said frame.

(References on following page)

References Cited

UNITED STATES PATENTS

| | | | |
|---|---|---|---|
| 3,142,113 | 7/1964 | Cloud | 29—263 |
| 3,174,218 | 3/1965 | McConaha | 29—256 |
| 1,717,618 | 6/1929 | Muchnic | 308—237 X |
| 1,757,731 | 5/1930 | Norling | 251—245 |
| 1,930,655 | 10/1933 | Muchnic | 308—237 X |
| 2,191,528 | 2/1940 | Hewel | 308—237 X |
| 2,448,147 | 8/1948 | Jacobsen | 308—237 X |
| 2,536,424 | 1/1951 | Curtis | 308—237 X |
| 2,608,880 | 9/1952 | Flinn | 74—472 |
| 2,697,017 | 12/1954 | Evans | 308—237 |
| 3,149,887 | 9/1964 | Moyer | 308—237 X |
| 3,313,239 | 4/1967 | Brunson | 308—237 X |
| 3,361,502 | 1/1968 | Weinkamer et al. | 308—237 |

THOMAS H. EAGER, Primary Examiner

U.S. Cl. X.R.

29—256, 263, 266, 283